Patented Feb. 3, 1931

1,791,103

UNITED STATES PATENT OFFICE

HERBERT H. MEYERS, OF PITTSBURGH, PENNSYLVANIA, ASSIGNOR TO ARMOUR FERTILIZER WORKS, OF CHICAGO, ILLINOIS, A CORPORATION OF NEW JERSEY

TREATMENT OF PHOSPHATE ROCK AND ALUNITE

No Drawing. Application filed December 8, 1928. Serial No. 324,806.

My invention relates to the production of cement, and more particularly to a high-alumina cement of the quick-hardening type and of a fertilizer material.

I have discovered that, if phosphate-rock is mixed in a finely-ground condition with finely divided alunite in proper proportions and calcined at a suitable temperature for an appropriate period of time, and, if such mixture is treated with a solution of ammonia and carbon dioxide, or their equivalent, ammonium carbonate, a large proportion of the $P_2O_5$ will be dissolved, and a considerable portion of the potash content of the alunite, which is not volatilized during the calcination, is also dissolved in the specified solution, so that the latter contains some $K_2O$ in addition to the $P_2O_5$ and ammonia.

The potash, however, is not completely dissolved, and, accordingly, the residue, consisting mainly of calcium carbonate and alumina, contains some potash, as well as a slight amount of residual $P_2O_5$, silica, etc., from the alunite.

If the correct proportions of phosphate-rock and alunite have been originally employed, and, assuming that the extraction of the $P_2O_5$ by the ammonia and carbon dioxide process, has been adequately complete, the solid residue from this treatment, consisting essentially of calcium carbonate and alumina, can be burned according to the usual aluminate cement practice, to provide a high-alumina, quick-hardening cement.

As a specific example of satisfactorily performing the new process, the following is submitted, but not in a limiting or restricting capacity.

About two hundred parts by weight of finely-divided, high-grade alunite, containing about 36% $Al_2O_3$, and approximately one hundred parts by weight of phosphate-rock containing about 47% lime, are calcined at a temperature of from 1300° to 1400° centigrade, and, upon grinding the calcined material to about 100 mesh, there is added to one part thereof by weight about three parts of ammonium carbonate and approximately six parts of water.

The mixture is then stirred until the decomposition or reaction is complete, the solution is filtered off whereupon the filtrate is evaporated (the vapors being condensed to recover the excess ammonium carbonate) until crystallization starts, upon the occurrence of which the whole mass is dried down at a temperature sufficiently low to prevent decomposition of ammonium phosphate and to result in a crystallized solid product containing 8% to 10% ammonia and approximately 50% to 60% of $P_2O_5$ as well as some potash.

The solid material from the specified filtration will have lime and alumina in the proper ratio to produce a very satisfactory cement when burned under proper conditions according to the practice for making aluminate cements.

Another course of operation comprises placing the ground, calcined, phosphate material in an autoclave, together with an excess of ammonia water, or commercial ammonia liquor, and, while agitating the mixture, carbon dioxide, as the pure gas, or in the form of flue gases, is blown into the mixture under slight pressure.

For the best results, enough carbon dioxide is introduced into the autoclave to produce normal ammonium carbonate, but an excess of carbon dioxide may be used. Owing to the neutralization taking place, the mixture heats up somewhat, and it is not advisable to allow such temperature to rise very high, agitation being continued until the mixture is cool, at least below 50° to 60° centigrade, after which the solution is filtered off and the residual calcium carbonate is thoroughly washed to assure complete extraction, the solution then, including the washing water, usually amounting to at least twice the volume of the original liquid. To this liquid is added ammonia, as gas or as anhydrous ammonia, until the ammonia content of the solution is about 20% or more. During, or at the end of the addition of ammonia, the solution can be allowed to cool to normal or room temperature and this may be accomplished, if desired, by water-cooling the reaction vessel during the period of introduction of the ammonia. By this means, 95% to 100

98% of the $P_2O_5$ content of the solution is precipitated as ammonium and alkali metal phosphates in crystalline form. The crystals are then separated from the solution and part of the residual solution, containing both ammonia and ammonium carbonate, is used after slight dilution for the extraction of more calcined phosphate. The remainder of the solution, which is not used for this purpose, is stripped of its ammonia and ammonium carbonate in the usual manner and then discarded.

The solid material, from the specified filtration, as in the previous instance cited, will have lime and alumina in the proper proportion to give a wholly satisfactory cement when burned in accordance with the usual practice and under proper conditions.

Thus, by the new process, we have the production of a high-alumina, quick-hardening cement on the one hand, and a concentrated fertilizer material on the other hand.

The production of the fertilizer material constitutes the subject-matter of my co-pending application Serial No. 269,874, manufacture of concentrated fertilizer material, filed April 13, 1928, the present specification relating more particularly to the manufacture of the cement indicated.

Those acquainted with this art will readily appreciate that the invention, as set forth in the appended claims, is not limited to the exact details of the process presented, and that reasonable changes may be incorporated in the modes of procedure without departure from the essential characteristics of the invention and without the sacrifice of any of its material benefits.

I claim:

1. The process of making relatively high-alumina comparatively quick-hardening cement, consisting in calcining a mixture of finely-ground phosphate-rock and finely-divided alunite, treating such calcined product with ammonia, water and carbon dioxide, separating the solid residue from the solution, and burning such separated residue according to the practice of making aluminate cements to produce a cement of the high-alumina quick-hardening type.

2. The process of making relatively high-alumina comparatively quick-hardening cement, consisting in calcining at a temperature of approximately 1300° to 1400° centigrade about two hundred parts by weight of finely-divided alunite containing about 36% $Al_2O_3$ and about one hundred parts by weight of finely-ground phosphate-rock containing approximately 47% lime, treating the calcined product with ammonia, water and carbon dioxide to practically completely remove the $P_2O_5$ content, and removing and burning the residue according to the practice for making aluminate cements to provide a cement of the high-alumina quick-hardening type.

In witness whereof I have hereunto set my hand.

HERBERT H. MEYERS.